US012001601B2

(12) United States Patent
 Geier et al.

(10) Patent No.: US 12,001,601 B2
(45) Date of Patent: Jun. 4, 2024

(54) WEARABLE HUMAN-MACHINE INTERFACE AND METHOD WHICH CAN BE CARRIED OUT USING SAME

(71) Applicant: HUMAIN SOLUTIONS UG (HAFTUNGSBESCHRÄNKT), Süderholz (DE)

(72) Inventors: Andreas Geier, Tokyo (JP); Prathamesh Prasad Sathe, Tokyo (JP); Rawleigh Cosmo Young Tucker, Tokyo (JP)

(73) Assignee: HUMAIN SOLUTIONS UG (HAFTUNGSBESCHRÄNKT), Süderhotz (DE)

( * ) Notice: Subject to any disclaimer, the term of this patent is extended or adjusted under 35 U.S.C. 154(b) by 0 days.

(21) Appl. No.: 17/613,615

(22) PCT Filed: May 28, 2019

(86) PCT No.: PCT/EP2019/063795
§ 371 (c)(1),
(2) Date: Nov. 23, 2021

(87) PCT Pub. No.: WO2020/239202
PCT Pub. Date: Dec. 3, 2020

(65) Prior Publication Data
US 2022/0236789 A1  Jul. 28, 2022

(51) Int. Cl.
   *G06F 3/01*  (2006.01)
   *G04G 21/08*  (2010.01)
   *G06F 1/16*  (2006.01)

(52) U.S. Cl.
   CPC ............. *G06F 3/011* (2013.01); *G06F 1/163* (2013.01); *G06F 3/017* (2013.01); *G04G 21/08* (2013.01)

(58) Field of Classification Search
   CPC .......... G06F 3/011; G06F 1/163; G06F 3/017; G06F 3/014; G06F 3/0346; G04G 21/08
   See application file for complete search history.

(56) References Cited

U.S. PATENT DOCUMENTS

| 8,743,052 B1 * | 6/2014 | Keller | G06F 3/017 345/156 |
| 9,141,194 B1 * | 9/2015 | Keyes | G06F 3/014 |

(Continued)

FOREIGN PATENT DOCUMENTS

| CN | 105190578 A | 12/2015 |
| CN | 10543349 A | 3/2016 |

(Continued)

OTHER PUBLICATIONS

PCT International Search Report and Written Opinion completed by the ISA/EP dated Jan. 21, 2020 and issued in connection with PCT/EP2019/063795.

(Continued)

*Primary Examiner* — Grant Sitta
(74) *Attorney, Agent, or Firm* — Barnes & Thornburg LLP

(57) ABSTRACT

A wearable human-machine interface may include a support element to attach to a skin area of a human or animal body, a flexible layer, with magnetic properties, attached to the support element on the face facing the skin area so as to contact the surface of the skin area, the flexible layer having a flexibility configured to follow deformations of the surface of the skin area, and the magnetic properties of the flexible layer configured such that a deformation of the surface of the skin area leads to a measurable change in the magnetic properties, a detection unit to measure changes in the magnetic properties of the flexible layer, and a processing unit to carry out an algorithm that assigns the measured change in the magnetic properties to a configuration, move- (Continued)

ment and/or intensity thereof. A method is also disclosed which can be carried out using the human-machine interface.

15 Claims, 1 Drawing Sheet

(56) References Cited

U.S. PATENT DOCUMENTS

| | | | |
|---|---|---|---|
| 10,478,099 B2* | 11/2019 | Lor | G06F 3/011 |
| 10,845,212 B1* | 11/2020 | Turkyilmaz | G01B 7/287 |
| 10,959,674 B2* | 3/2021 | Leaper | A61N 1/0484 |
| 11,079,846 B2* | 8/2021 | Morun | A61B 5/296 |
| 11,331,045 B1* | 5/2022 | Moschella | A61B 5/389 |
| 11,493,993 B2* | 11/2022 | Rubin | G06F 3/011 |
| 2009/0174578 A1 | 7/2009 | Taki | |
| 2010/0179440 A1* | 7/2010 | Lee | A61B 5/02444 |
| | | | 600/500 |
| 2012/0154288 A1* | 6/2012 | Walker | G06F 1/1677 |
| | | | 345/169 |
| 2013/0232095 A1 | 9/2013 | Tan et al. | |
| 2014/0176439 A1* | 6/2014 | Keller | G06F 3/014 |
| | | | 345/159 |
| 2015/0101423 A1* | 4/2015 | Tuli | G06F 1/163 |
| | | | 73/865.4 |
| 2015/0269825 A1 | 9/2015 | Tran | |
| 2016/0084869 A1 | 3/2016 | Yuen et al. | |
| 2017/0065184 A1 | 3/2017 | Barak | |
| 2017/0311849 A1 | 11/2017 | Lynde et al. | |
| 2018/0078183 A1* | 3/2018 | Lor | G06F 3/011 |
| 2018/0307314 A1* | 10/2018 | Connor | G06F 3/017 |
| 2018/0307507 A1* | 10/2018 | Kim | G06F 1/1694 |
| 2019/0029584 A1 | 1/2019 | Carr-Jordan et al. | |
| 2019/0107887 A1 | 4/2019 | Bazor | |
| 2019/0146583 A1 | 5/2019 | Seth | |
| 2019/0212821 A1* | 7/2019 | Keller | G06F 3/0426 |
| 2020/0192487 A1* | 6/2020 | Fang | G06F 3/017 |

FOREIGN PATENT DOCUMENTS

| | | |
|---|---|---|
| CN | 106535750 A | 3/2017 |
| CN | 107850935 A | 3/2018 |
| JP | 2001112725 A | 4/2001 |
| JP | 2008027252 A | 2/2008 |
| JP | 2015114182 A | 6/2015 |
| JP | 2016507851 A | 3/2016 |
| JP | 2018536933 A | 12/2018 |
| KR | 20180028861 A | 3/2018 |
| WO | 2014130871 A1 | 8/2014 |
| WO | 2017075611 A1 | 5/2017 |
| WO | 2019074950 A1 | 4/2019 |

OTHER PUBLICATIONS

PCT International Preliminary Report on Patentability dated Sep. 8, 2021 in connection with PCT/EP2019/063795.
Examination Report dated Feb. 7, 2023 for co-pending Japanese application 2021-571353—5 pages (English translation appended).
Examination Report for corresponding CN application No. 201980096812.1, dated Jan. 27, 20224.
Office Action and Search Report for copending BR Patent Application No. 112021023351-2, mailed Feb. 15, 2024.
Office Action and Search Report for copending TW Patent Application No. 109116890, mailed Mar. 27, 2024.

* cited by examiner

WEARABLE HUMAN-MACHINE INTERFACE AND METHOD WHICH CAN BE CARRIED OUT USING SAME

CROSS-REFERENCE TO RELATED APPLICATION

This is a national stage entry of International Patent Application No. PCT/EP2019/063795, filed May 28, 2019.

FIELD OF THE DISCLOSURE

The present invention relates to a novel human-machine interface and to a method which can be carried out with such a human-machine interface.

BACKGROUND

Owing to the increasing interconnectedness and digitalisation of the environment in which human beings and animals nowadays live, it is necessary more and more that communication takes place between a human being (or also an animal) and electronic devices of all kinds. A keyword which may be mentioned here is the term internet of things (IoT), which is generally understood as meaning that a connection with a plurality of devices is or will in future be possible via the internet, allowing those devices to be operated, or controlled, by users. Without any claim to completeness, examples of such devices which may be mentioned include vehicles of all kinds, domestic appliances, heating systems for buildings, fitness trainers, gaming devices, drones, robots and many others. In order to operate, or control, these and other devices, intelligent human-machine interfaces are required which make it possible for a human being (or animal) to use such devices as easily and intuitively as possible.

SUMMARY

The object underlying the present invention is to provide such a, preferably wearable, human-machine interface.

In order to achieve the mentioned object there is proposed a preferably wearable human-machine interface which has an element to be worn which is configured to be attached to an area of skin of a human or animal body. Any element which is suitable for fastening the human-machine interface, preferably detachably, to the desired area of skin of a human or animal body can be used as the element to be worn. The human-machine interface according to the invention further has a flexible layer with magnetic properties which is attached to the element to be worn on a side that faces the area of skin of the human or animal body so as to come into contact with the surface of the area of skin. The flexibility of the layer with magnetic properties must be such that the layer is able at least substantially to follow deformations of the surface of the area of skin. Within the context of the present invention, "magnetic properties" is understood as meaning that the magnetic properties of the layer are configured in such a manner that a deformation of the surface of the area of skin, which the flexible layer with magnetic properties follows, leads to a measurable change of the magnetic properties. The human-machine interface according to the invention further comprises a detection unit which measures changes of the magnetic properties of the flexible layer. In other words, the detection unit is configured to measure at least those changes of the magnetic properties of the flexible layer that, in relation to an initial state, are caused by a deformation of the surface of the area of skin. Finally, the human-machine interface according to the invention comprises a processing unit which is adapted to perform an algorithm which allocates the measured change of the magnetic properties to a configuration and/or movement and/or movement intensity.

The causes of the deformation of the surface of an area of skin can be voluntary or involuntary. For example, a person can voluntarily move his limbs into a different position, which brings about corresponding deformations of specific areas of skin. On the other hand, involuntary deformations of specific areas of skin can occur, for example, on account of a disease of a person (for example through involuntary muscle contractions or organ movements), the detection and allocation of which can enable a doctor to make a better diagnosis.

Within the context of the present invention, the term "configuration" means the totality of the joint angles necessary for describing the degrees of freedom of the limb in question. In other words, a "configuration" is a specific position of a human or animal limb (examples which may be mentioned here include: leg extended, leg bent, hand open, hand closed, arm straight, arm bent, hand twisted or not twisted relative to the elbow, etc.). A configuration can of course also indicate a state between two end configurations, for example arm partially extended, hand partially closed, etc.

Within the context of the present invention, the term "movement" means a temporal change (in particular in terms of magnitude and speed) of a configuration.

Within the context of the present invention, the expression "intensity of the movement" means in particular the force with which a movement is performed.

In general terms, voluntary or involuntary muscle, tendon, ligament, bone and/or organ movements in a human or animal body result in a deformation of the surface of areas of skin. It is an aim of the present invention to detect such deformations and reliably allocate them to specific states (configurations) and/or movements and also, if desired, movement intensity.

The above-mentioned processing unit which belongs to the human-machine interface can be integrated or separate. "Integrated" here means that the processing unit is situated directly on the wearable human-machine interface. However, the processing unit may also be located remotely from the wearable human-machine interface and communicate with the human-machine interface via a wired or wireless connection, for example.

The flexible layer with magnetic properties can have different forms. It is important, however, that it conforms sufficiently to the surface of the area of skin that is of interest, so that deformations of the skin surface that occur, and the associated deformations of the flexible layer, lead to measurable changes of the magnetic properties. More precisely, changes of the magnetic field strength and/or changes of the magnetic flux density are preferably measured. In other words, the magnetic field that is produced in each case is measured, whereby an existing magnetic field does not itself necessarily have to change but merely needs to constitute a different magnetic field from the point of view of the detection unit following a deformation of the skin. It is advantageous in this connection if the flexible layer contains a pole configuration with many north-south pole pairs. In this manner, a displacement or twisting of the flexible layer with magnetic properties permits magnetisation that is measurable from outside by measuring the magnetic field. The important factor here is the pole configuration with the strength of the magnetisation in question, so that changes of the magnetic flux density and/or magnetic field strength are measurable by magnetometers.

According to a preferred embodiment of the human-machine interface according to the invention, the flexible layer contains a plurality of magnets which are preferably arranged in the form of an array, wherein, as already stated, the measurable change of the magnetic properties of the flexible layer is to be understood as being measurable changes of the magnetic field strength and/or measurable changes of the magnetic flux density. The term "magnet" here means a single permanent magnet, but also a conductor through which current flows or a magnetisable particle or a group of magnetisable particles (which can be arranged, for example, in a magnetic tape or a magnetic strip). It is important only that each "magnet" leads to a magnetisation which is effective externally and can be detected by the detection unit. A flexible layer with magnetic properties and an advantageous pole configuration can be achieved, for example, by setting commercially available permanent magnets with a simple north-south pole configuration into a band-like, resilient silicone layer. Many other arrangements are of course conceivable and likewise suitable.

In no way does the flexible layer with magnetic properties have to be separate from the element to be worn. In advantageous embodiments of the human-machine interface according to the invention, it is in fact appropriate to combine the element to be worn and the flexible layer with magnetic properties in one component. Such a component combining both elements can be for example in the form of a strap, as is also used for wristwatches.

The detection unit of the human-machine interface according to the invention preferably contains multiple magnetometers for measuring the changes of the magnetic properties of the flexible layer. The multiple magnetometers are advantageously likewise arranged in the form an array, wherein this array does not have to correspond to the array in which the plurality of magnets are arranged. Nor does the number of magnetometers need to correspond to the number of magnets which the flexible layer contains.

In addition to measuring the change of the magnetic properties of the flexible layer, it can be advantageous to acquire further information which arises during a deformation of the surface of an area of skin of interest. For this reason, there are further present in preferred embodiments of human-machine interfaces according to the invention one or more acceleration sensors and/or rotation rate sensors, the output signals of which can likewise be fed to the processing unit.

On the basis of the detected changes of the magnetic properties of the flexible layer which have occurred as a result of a deformation of the surface of an area of skin of interest, the processing unit performs an allocation algorithm which allocates the measured change (or the measured changes) of the magnetic properties to a configuration and/or a movement and/or an intensity of the movement. On the basis of the allocated configuration and/or movement and/or movement intensity, the processing unit or a downstream control unit can then for example generate a control command, which is fed to a device which subsequently performs an action corresponding to the control command. Accordingly, the action performed by the device corresponds to the at least one configuration and/or movement and/or movement intensity allocated by the processing unit, or the allocation algorithm. The allocated configuration and/or movement and/or movement intensity can be, for example, a gesture.

The allocation of the change of the magnetic properties of the flexible layer detected by the detection unit, for example, by means of magnetometer measurements to a configuration of a human limb, for example, can advantageously be achieved with the aid of artificial intelligence. The processing unit of a human-machine interface according to the invention is therefore preferably adapted to allocate the measured change of the magnetic properties of the flexible layer to a configuration and/or movement and/or movement intensity with the aid of Bayes classifiers, an artificial neural network, a support vector machine, a finite state machine, a hidden Markov model, a relevance vector machine, a dynamic time warping method, a conditional random field method, a decision tree, a random forest method, a k-nearest neighbours algorithm, a discriminant analysis, a linear regression, a logistic regression, a Gaussian process, a perceptron and/or ensemble methods (Bayes optimal classifier, bagging, boosting), optionally with the additional inclusion of the data supplied by rotation rate and/or acceleration sensors. In general, it can be said that data sets consisting of specific magnetic properties and an associated, arbitrary configuration and/or movement are recorded first of all and then the relationship between those parameters is determined in so-called training. A distinction is therefore to be made between a learning or training mode, in which sufficient measured data must be acquired and allocated in order subsequently, in a prediction mode, to permit correct allocation of a single magnetometer measurement or of multiple magnetometer measurements to a configuration and/or movement and/or movement intensity.

Advantageous embodiments of the human-machine interface according to the invention are further provided with a communication unit for exchanging data with at least one external device which, on the basis of the data exchanged with the human-machine interface, is able to perform an action which corresponds to the at least one allocated configuration and/or movement and/or movement intensity. For example, a human-machine interface according to the invention can be integrated into a smartwatch, so that functions of the smartwatch can be carried out with the aid of the human-machine interface according to the invention. It would be conceivable, for example, that specific finger and/or hand movements are allocated to specific functions and/or control commands of a smartwatch, so that the smartwatch can be operated simply and intuitively by performing those movements.

The present invention is directed also to a method for detecting a deformation of the surface of an area of skin of a human or animal body and allocating the detected deformation to a configuration and/or movement and/or movement intensity, which method comprises the following steps:

arranging an array of magnets on or close to an area of skin in such a manner that the array follows a deformation of the skin, determining at least one magnetic signature of the array of magnets by measuring the measurable change of the magnetic properties of the array of magnets that has taken place as a result of a deformation of the skin, and performing an algorithm for allocating the determined at least one magnetic signature to a configuration and/or movement and/or movement intensity.

As already discussed hereinbefore, the deformation of the surface of the area of skin can be based on an involuntary or voluntary muscle, tendon, ligament, bone and/or organ movement.

As already discussed hereinbefore in connection with the human-machine interface according to the invention, the allocation algorithm is preferably a trained artificial intelligence which has determined or learned the relationship between magnetic signatures and associated configurations and/or movements and/or movement intensity on the basis of a data set consisting of at least one magnetic signature and the associated configuration and/or movement and/or movement intensity. As the allocation algorithm preferably those algorithms that have already been mentioned above in connection with the human-machine interface can be used.

The expression "magnetic signature of the array of magnets" means the totality of the changes of the magnetic properties of the magnet array that are to be measured or have been measured, which changes are the result of a deformation of the surface of an area of skin of interest that has taken place. Another magnetic signature which describes an initial state before the occurrence of a deformation of the skin can serve as reference. In particular, signal conditioning or initialisation can be carried out on the basis of a predetermined reference configuration before the start of detection of a change of the magnetic signature. For example, for such a reference configuration, all the measured signals can be zeroised and changes of the magnetic signature can be measured starting from this reference configuration.

According to an exemplary embodiment, each magnetic signature is composed of measured magnetic field strengths and/or measured magnetic flux densities of the magnet array.

Accordingly, in the present invention, the measured changes of the magnetic properties of the magnetic layer, or of the magnet array, that are the result of a deformation or deformations of the skin constitute the wanted signal. Other changes, which can be caused, for example, by disturbance variables such as the earth's magnetic field or magnetic objects, must be filtered out of the measured signal if necessary. If, for example, there are magnetic components in the human-machine interface, these can be permanently compensated for by means of a so-called hard-soft-iron calibration, that is to say such a calibration must only be carried out once for a given human-machine interface. The earth's magnetic field at a site of use of the human-machine interface can also be permanently compensated for by means of such a hard-soft-iron calibration. In order to compensate for other external sources of interference, one or more magnetometers of the human-machine interface can be so arranged that they measure only the magnetic field of the source(s) of interference. In this manner, sources of interference can then be compensated for in the case of those magnetometers that are used for determining the changes of the magnetic properties of the magnetic layer, or of the magnet array, that are the result of a deformation of the skin.

As already discussed hereinbefore in connection with the human-machine interface, the magnetic field strengths to be measured and/or magnetic flux densities to be measured are advantageously detected by means of multiple magnetometers which are preferably arranged in the form of an array (which, however, does not need to correspond to the array in which the magnets are arranged). The magnetic field strengths to be measured and/or magnetic flux densities to be measured are thereby detected preferably in the x- and/or y- and/or z-direction. In preferred exemplary embodiments of the method according to the invention and of the human-machine interface according to the invention, detection of the mentioned parameters takes place in the x-, y- and z-direction.

In addition to determining magnetic signatures, embodiments of the method according to the invention can comprise the step of determining accelerations and/or rotation rates.

As already discussed, the method according to the invention optionally comprises the step of assigning a control command to an allocated configuration and/or movement and/or movement intensity, and also the step of transmitting the control command to a device. This device can form a unit with a human-machine interface according to the invention or can be remote from the human-machine interface. Transmission of the control command to the device can take place in a wired or wireless manner and can involve the use of the internet, for example.

BRIEF DESCRIPTION OF THE DRAWINGS

Exemplary embodiments of a human-machine interface according to the invention and of the method according to the invention will be explained in greater detail hereinbelow with reference to the accompanying, schematic drawings, in which.

DESCRIPTION

Figure 1:
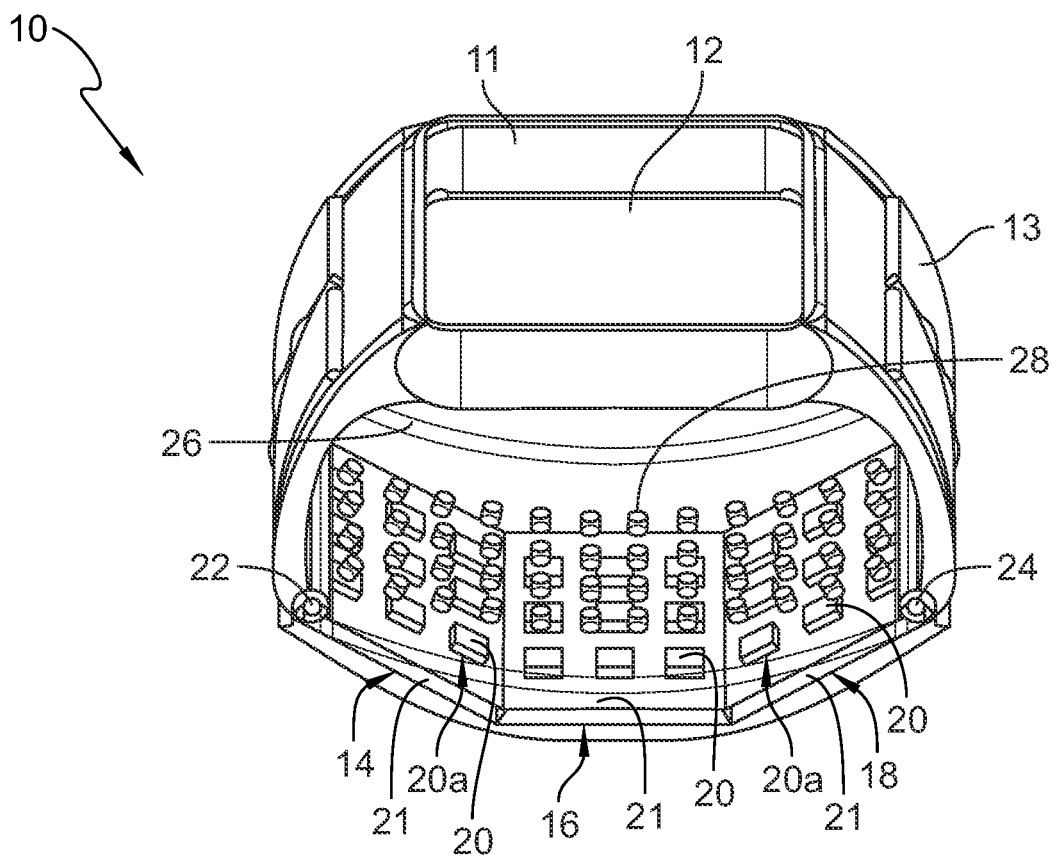
FIG. 1 is a spatial view of an exemplary embodiment of a human-machine interface obliquely from above.
Figure 2:
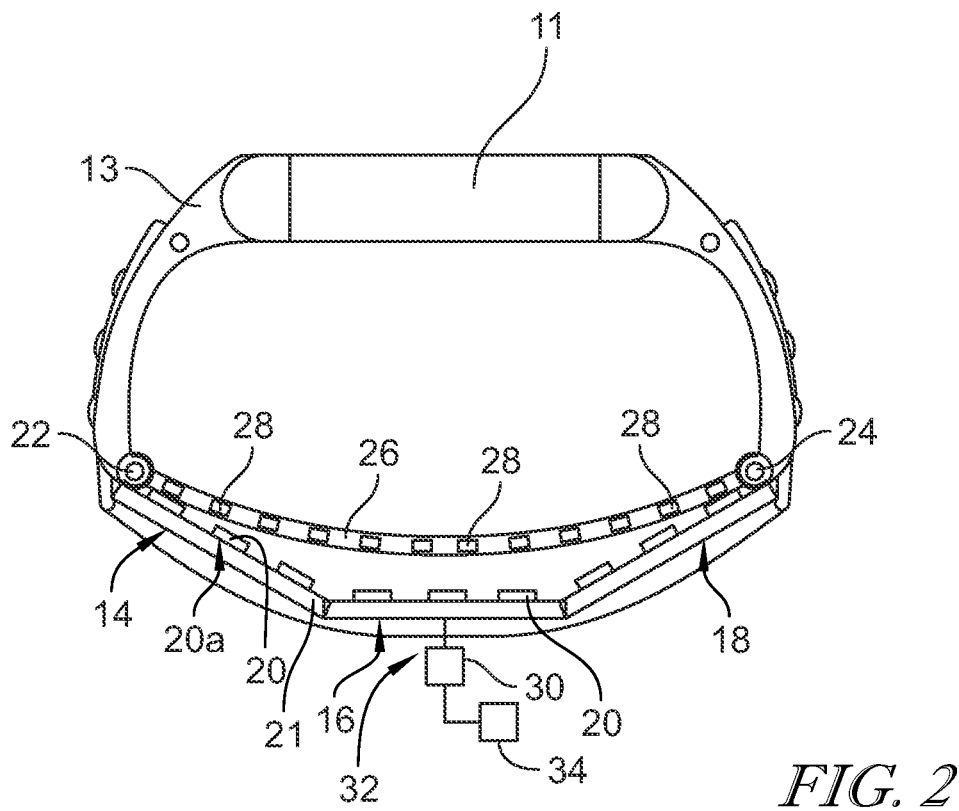
FIG. 2 is a side view of the human-machine interface of FIG. 1.

FIGS. 1 and 2 show schematically a human-machine interface designated generally 10 which was used to carry out a method according to the invention described in greater detail hereinbelow. In the exemplary embodiment shown, the human-machine interface 10 is similar to a smartwatch and has at the top a casing 11 in the form of a frame which encloses a recess 12, which here is rectangular, which serves to receive a smartwatch module or a microcontroller and/or microprocessor 30 generally. By means of a strap-like element to be worn 13, the human-machine interface 10 can be fastened to the wrist of a user. The element to be worn 13 is adjustable in the manner of a strap for a wristwatch in order to be able to adapt to different wrist diameters.

In the lower region, the element to be worn 13 has three segments 14, 16 and 18 which are connected together in an articulated manner and which serve to receive in each case a 3×3 array of magnetometers 20. In this exemplary embodiment, each magnetometer 20 contains three non-collinear Hall effect sensors and can accordingly measure the magnetic flux density in x-, y- and z-directions. Each 3×3 magnetometer array is here configured as a printed circuit board 21 with in each case 3×3 sensor chips 20a in which the magnetometers 20 are arranged. Each sensor chip 20a contains, in addition to a magnetometer 20, also an acceleration sensor and a rotation rate sensor and would accordingly permit 9-axis measurement. In the present case, however, only the magnetometer function of each sensor chip 20a was used. Sensor chips of the mentioned type and configuration are commercially available. Instead of the commercially available sensor chips used here, it would also be possible to use pure magnetometers, whereby the magnetometer array could be made smaller or more magnetometer measurements could be obtained with the same size.

The magnetometers 20 are arranged on the inner side of the element to be worn 13 and accordingly face the skin surface of a wrist on which the human-machine interface 10 is fastened.

By means of two articulated connecting elements 22, 24, a band-like flexible layer 26 made of silicone rubber is attached to the element to be worn 13 above, in the figures, the three segments 14, 16 and 18 carrying the magnetometers 20, in which flexible layer an array of 4×12 magnets 28 is embedded. The silicone rubber used in the exemplary embodiment described here is transparent. The flexible layer 26 with the magnets 28 embedded therein lies against the underside of the wrist of a user in such a manner that it conforms to the skin. The magnetometers 20 and the magnets 28 are not coupled by a physical medium, as is necessary, for example, in the case of force or pressure sensors. The flexible layer 26 of silicone rubber is highly resilient, in order to minimise hysteresis phenomena, but at the same time sufficiently flexible to be able to follow even small deformations of the skin.

The magnets 28 used here are neodymium permanent magnets of NdFeB in disc form, with a diameter of 1.5 mm and a height of 0.5 mm. The magnetisation was N50, the direction of magnetisation ran axially, that is to say parallel to the height. The north pole of each magnet 28 was arranged on the skin side, the south pole of each magnet 28 consequently faced the magnetometers 20. The distances between the magnets 28 were in each case 5 mm.

The three segments 14, 16 and 18 arranged in an articulated manner, each of which here has dimensions of approximately 22 mm (width)×29 mm (length), with the magnetometers 20 arranged thereon form, together with multiplexers which are not shown here (the use of multiplexers is optional and serves merely to allow communication with a large number of sensors via a small number of data lines) and the microcontroller 30, the detection unit 32 of the human-machine interface 10. There can be used as the microcontroller 30, for example, a microcontroller that is already present in a smartwatch or other electronic device, or a microprocessor.

The detected magnetometer measurements are fed by the microcontroller 30 to a processing unit 34 which, by means of the CNN implemented therein, is able to perform an allocation of the measured magnetic signature to a configuration and/or movement and/or movement intensity. This processing unit 34 can be integrated into a smartwatch, for example, and would then be an integral part of the human-machine interface 10; however, it may also be remote from the human-machine interface and communicate with the arrangement shown in the figures wirelessly, for example.

The exemplary embodiment of a method according to the invention which will now be described allows magnetometer measurements to be allocated, for example, to a plurality of freely definable hand/finger configurations within the context of gesture recognition by means of the human-machine interface 10 described hereinbefore.

The human-machine interface 10 was fastened like a wristwatch to the left wrist of a user, and magnetic signatures which are associated with specific hand/finger configurations were then measured with this human-machine interface 10. The flat outstretched hand of the user served as the reference configuration.

The human-machine interface 10 used contained as the flexible layer 26 with magnetic properties a silicone layer in which an array of 4×12 magnets was embedded. The relative distances between the magnets 28 were 5 mm.

For measuring the magnetic signature of this magnet array, a magnetometer array which had 9×3 magnetometers 20 and was divided into three subarrays with 3×3 magnetometers was used.

In order to allocate the magnetometer measurements supplied by the human-machine interface 10 to the configurations of the individual fingers of the left hand, a so-called convolutional neural network (CNN), which is an exemplary embodiment of an artificial neural network, was used here. Each magnetometer 20 detected the magnetic field acting on it in the x-, y- and z-direction. Accordingly, 81 measured values had to be processed per measuring step or, in other words, each magnetic signature consisted of 81 individual values. On the basis of a large number of such measurements, the CNN in prediction mode is able to predict the particular class from the magnetometer measurements. Such a class here corresponds to a discrete gesture, whereby each gesture should have a different magnetic signature. In the case described here, the allocation problem was therefore formulated as a multi-class classification problem.

The use of a CNN is not a condition for the method according to the invention. Alternatively, it is possible to use, for example, also support vector machines, random tree forests or further methods or algorithms already mentioned above. However, the use of a CNN appeared advantageous because its use yields very good results and a CNN is also very readily scalable to larger amounts of data. Furthermore, the use of a CNN permits a particularly compact representation of parameters to be learned, which is advantageous in terms of classification accuracy and resource efficiency, in particular in the case of an intended use for mobile applications and IoT (internet of things) applications. Moreover, CNNs are robust towards translation, rotation, scale and intensity variances, so that on the one hand a large data pool for optimising the free parameters can be generated in order to increase the effectiveness of a CNN, and on the other hand a generalisation of learned relationships between a deformation of the skin and an associated configuration can more readily be transferred to a plurality of users and their individual characteristics.

A CNN is generally one of the algorithms belonging to artificial intelligence and more precisely monitored learning by means of artificial neural networks. The magnetometer measurements serve as the input of the CNN, while an associated, arbitrary gesture is recorded or defined as the output of the CNN. Data sets consisting of the magnetometer measurements (input of the CNN) and an associated, arbitrary gesture (output of the CNN) are recorded or prepared, and then the relationship of those parameters is determined by optimising the free parameters of the CNN in so-called training.

In the exemplary embodiment described, an individual training example consists of a qualitative configuration of the hand, that is to say a definite class encoded as a so-called one-hot vector, and the totality of the magnetometer measurements detected in the x-, y- and z-directions while maintaining the qualitative configuration of the hand.

Owing to the arrangement of the magnetometers 20 as a 3×9 array in the human-machine interface 10 used, in each case 27 support points for measurement of the magnetic signature in the x-, y- and z-direction are obtained in the case of one measurement. The magnetic signature of the flexible layer 26 obtained from the individual magnetometer measurements and resulting from the deformation of the skin can accordingly be summarised as a topographic measurement of the deformation of the skin with the 27 support points as a matrix for processing in the CNN. As already mentioned above, the training example is completed by a respective label which indicates the associated class, that is to say the associated configuration.

Accordingly, in the exemplary embodiment described, a training data set is composed of a matrix X of dimension
(m, nC, nH, nW) where m is the number of training examples, nH is the number of magnetometers in the y-direction (height of the magnetometer array), nW is the number of magnetometers in the x-direction (width of the magnetometer array), nC is the number of channels (x-, y-, z-directions)
and a matrix Y of dimension
(m, nG) where m is the number of training examples and nG is the number of gestures.

Each of the 81 measured values of a magnetic signature was in each case standardised by means of its arithmetic means and standard deviations determined from the matrix X (so-called Z score standardisation or Z transformation). These arithmetic means and standard deviations determined in the training mode from the measured values can also be used later, that is to say when training is complete, in the prediction mode for the signal conditioning of new measurements of magnetic signatures for standardisation.

Within the context of the experimental trial, m=18,000 training examples (which formed a training data set), 3,375 test examples (which formed a test data set), 1,125 validation examples (which formed a validation data set) and nG=6 gestures were first studied in order to train the CNN. The CNN was trained only with the training data set. Evaluation of the test data set served to evaluate and finely adjust the CNN in order to achieve an optimal performance in terms of the prediction accuracy and the generalisability of the CNN. A validation data set is used at the very end for final evaluation in order thereby to ensure that the CNN can actually reliably classify, that is to say allocate, data sets which were hitherto unknown to it.

Training of the CNN consists of so-called forward propagation and backward propagation. Forward propagation describes the forward branch of the calculation, that is to say the prediction of the class on the basis of the magnetometer measurements and the instantaneous parameters of the CNN. By means of a cost function, the free parameters of the CNN are then changed in the backward propagation, that is to say in the backward branch, so that the value of the cost function becomes smaller and in particular is minimised. In the exemplary embodiment described here, the cost function was formulated as a so-called categorical cross-entropy loss. The backward propagation is accordingly an optimisation method for determining the free parameters of the CNN. The CNN used was trained in 50 epochs with a batch size of 16, which means that the entire training data set was given to the CNN for optimisation 50 times, whereby, for reasons of numerical stability, 16 training data sets were always fed into the CNN simultaneously. The Adadelta optimisation method was used with the following parameters: initial, adaptive learning rate IR=1.0, Adadelta decay factor rho=0.95, fuzz factor epsilon=1e-07, initial learning rate decay factor decay=0.0.

The architecture of the CNN used is portrayed in the following Table 1.

The filter kernels of the convolutional and fully-connected layers were thereby initialised via the Glorot uniform (Xavier) method. Furthermore, the filter kernels of the convolutional layers were regularised with a weighting factor of 0.001 L2-norm. Finally, the filter kernels of the convolutional layers contain biases, which were initialised to ZERO.

In conclusion, the magnetometer measurements were classified into the correct class with the following accuracies: training 99.34%, test 99.53%, validation 99.29%.

With the described exemplary embodiment, in the prediction mode of a CNN trained in this manner, a single measuring step of all the magnetometers of the human-machine interface is then sufficient to identify a static gesture. However, it is possible to measure not only static states but also temporal changes of the magnetic signature, for which purpose multiple measuring steps are then required. For the evaluation thereof, so-called recurrent neural nets (LSTMs [long-short-term memory] or GNNs [gated neural network]) can be used in order to classify gestures or identify continuous finger movements.

The wearable human-machine interface 10 is strapped on like a wristwatch, so that the sensor modules of the detection unit record deformations of the skin at the wrist via a change of the magnetic flux density. More precisely, by the performance of hand and finger movements, the skin is deformed by muscle, ligament, tendon and bone movements. The flexible layer 26 with the embedded magnets 28 follows this deformation, so that relative displacements and rotations of the magnets 28 relative to the magnetometers 20 occur. These relative changes in the magnetic flux density as a result of the hand and finger movements can accordingly be reconstructed from the magnetometer measurements. The training phase is usually more computationally intensive and is advantageously carried out on a powerful computer or a processing unit optimised for artificial neural networks.

A trained CNN can, however, carry out a prediction in a very computationally efficient manner. On account of the many data sets resulting from the training phase, not only is a high degree of accuracy of the prediction achieved but also a high degree of robustness thereof. Since the prediction mode, apart from processes for signal conditioning, contains only the so-called forward propagation, prediction is extremely computationally efficient as compared with training and can therefore be carried out, for example, also on smartphones and similar mobile devices. In the concretely described example, gestures can be identified extremely quickly by means of the 81 magnetometer measurements, depending on the sampling frequency, in that those measurements are sent in a single step through the CNN optimised by means of training. A control signal allocated to the

TABLE 1

| | Layer | Starting dimension | Filter kernel | Stride | Padding | Activation function |
|---|---|---|---|---|---|---|
| | Input | (None, 3, 3, 9) | / | / | / | / |
| Conv. | Convolution | (None, 9, 3, 9) | (1, 1) | (1, 1) | 'same' | / |
| Block | Activation | (None, 9, 3, 9) | / | / | / | ReLu |
| 1 | MaxPooling | (None, 9, 2, 5) | (2, 2) | (2, 2) | 'same' | / |
| Conv. | Convolution | (None, 18, 2, 5) | (2, 2) | (1, 1) | 'same' | / |
| Block | Activation | (None, 18, 2, 5) | / | / | / | ReLu |
| 2 | MaxPooling | (None, 18, 1, 3) | (2, 2) | (2, 2) | 'same' | / |
| Conv. | Convolution | (None, 36, 1, 3) | (3, 3) | (1, 1) | 'same' | / |
| Block | Activation | (None, 36, 1, 3) | / | / | / | ReLu |
| 3 | MaxPooling | (None, 36, 1, 2) | (2, 2) | (2, 2) | 'same' | / |
| 4 | Flatten | (None, 72) | / | / | / | / |
| 5 | FullyConnected | (None, 6) | / | / | / | / |
| 6 | Output | (None, 6) | / | / | / | Softmax |
| | Output | Classification corresponding to largest probability value | | | | | identified gesture can then be sent by the processing unit or a downstream control unit directly to the device to be controlled.

The invention claimed is:

1. A wearable human-machine interface, comprising:
an element to be worn, the element configured to be attached to an area of skin of a limb of a human or animal body,
a flexible layer, with magnetic properties, attached to the element to be worn on a side of the element to be worn that faces the area of skin of the human or animal body so as to come into contact with the surface of the area of skin upon attachment of the element to the area of skin, wherein the flexible layer has a flexibility configured to at least substantially follow deformations of the surface of the area of skin, and wherein the magnetic properties of the flexible layer are configured such that a deformation of the surface of the area of skin leads to a measurable change of the magnetic properties of the flexible layer,
a detection unit which measures changes of the magnetic properties of the flexible layer caused by a corresponding deformation of the surface area of the skin, and
an integrated or separate processing unit configured to perform an algorithm which allocates the measured change of the magnetic properties of the flexible layer to at least one of a configuration, a movement and a movement intensity, with the aid of at least one of Bayes classifiers, an artificial neural network, a support vector machine, a finite state machine, a hidden Markov model, a relevance vector machine, a dynamic time warping method, a conditional random field method, a decision tree, a random forest method, a k-nearest neighbours algorithm, a discriminant analysis, a linear regression, a logistic regression, a Gaussian process, a perceptron and ensemble methods, wherein the ensemble methods include at least one of a Bayes optimal classifier, bagging and boosting, wherein the configuration is a specific position of the limb of the human or animal and the movement is a temporal change of the configuration, the integrated or separate processing unit further configured to assign a control command to the allocated at least one of the configuration, the movement and the movement intensity, and to transmit the control command to a device to cause the device to perform an action corresponding to the control command.

2. The wearable human-machine interface according to claim 1, wherein the flexible layer contains a plurality of magnets arranged in the form of an array, and wherein the measurable change of the magnetic properties of the flexible layer include at least one of measurable changes of a magnetic field strength of the plurality of magnets and measurable changes of a magnetic flux density of the plurality of magnets.

3. The wearable human-machine interface according to claim 1, wherein the element to be worn and the flexible layer with magnetic properties are combined in one component.

4. The wearable human-machine interface according to claim 1, wherein the detection unit contains multiple magnetometers.

5. The wearable human-machine interface according to claim 1, wherein a deformation of the surface of the area of skin is based on an involuntary or voluntary movement of at least one of a muscle, tendon, ligament, bone and organ.

6. The wearable human-machine interface according to claim 1, further comprising at least one of one or more acceleration sensors and one or more rotation rate sensors, the output signals of which are fed to the processing unit.

7. The wearable human-machine interface according to claim 1, wherein the human-machine interface is integrated into a smartwatch.

8. A method for detecting a deformation of the surface of an area of skin of a limb of a human or animal body and allocating the detected deformation to at least one of a configuration, a movement and a movement intensity, wherein the configuration is a specific position of the limb of the human or animal and the movement is a temporal change of the configuration, the method comprising:
arranging an array of magnets on or close to the area of skin in such a manner that the array follows a deformation of the skin,
determining at least one magnetic signature of the array of magnets by measuring a measurable change of magnetic properties of the array of magnets that has taken place as a result of the deformation of the skin,
performing an algorithm for allocating the determined at least one magnetic signature to the at least one of the configuration, the movement and the movement intensity, wherein the algorithm is a trained artificial intelligence which has determined or learned a relationship between magnetic signatures and associated at least one of configurations, movements and movement intensities on the basis of a data set consisting of at least one magnetic signature and associated at least one of configuration, movement and movement intensity, and wherein magnetic signatures are allocated to associated at least one of configurations, movements and movement intensities with the aid of at least one of Bayes classifiers, an artificial neural network, a support vector machine, a finite state machine, a hidden Markov model, a relevance vector machine, a dynamic time warping method, a conditional random field method, a decision tree, a random forest method, a k-nearest neighbours algorithm, a discriminant analysis, a linear regression, a logistic regression, a Gaussian process, a perceptron and ensemble methods, wherein the ensemble methods include at least one of a Bayes optimal classifier, bagging, and boosting,
assigning a control command to an allocated at least one of the configuration, the movement and the movement intensity,
transmitting the control command to a device,
performing, by the device, an action corresponding to the control command.

9. The method according to claim 8, wherein each magnetic signature includes at least one of measured magnetic field strengths and measured magnetic flux densities.

10. The method according to claim 8, wherein before the measurable change of the magnetic properties of the array of magnets that occurs as a result of a deformation of the skin is measured, a signal initialisation is carried out on the basis of a predetermined reference configuration.

11. The method according to claim 9, wherein the at least one of the magnetic field strengths and the magnetic flux densities are detected by multiple magnetometers arranged in the form of an array.

12. The method according to claim 11, wherein the at least one of the magnetic field strengths and the magnetic flux densities are detected in at least one of the x-, y- and z-direction.

13. The method according to claim 10, wherein for signal initialisation, the magnetometers are zeroised in each detection direction on the basis of the predetermined reference configuration.

14. The method according to claim 8, wherein the deformation of the surface of the area of skin is based on an involuntary or voluntary movement of at least one of a muscle, tendon, ligament, bone and organ.

15. The method according to claim 8, further comprising determining at least one of accelerations and rotation rates in addition to determining magnetic signatures.

* * * * *